Figure 1:
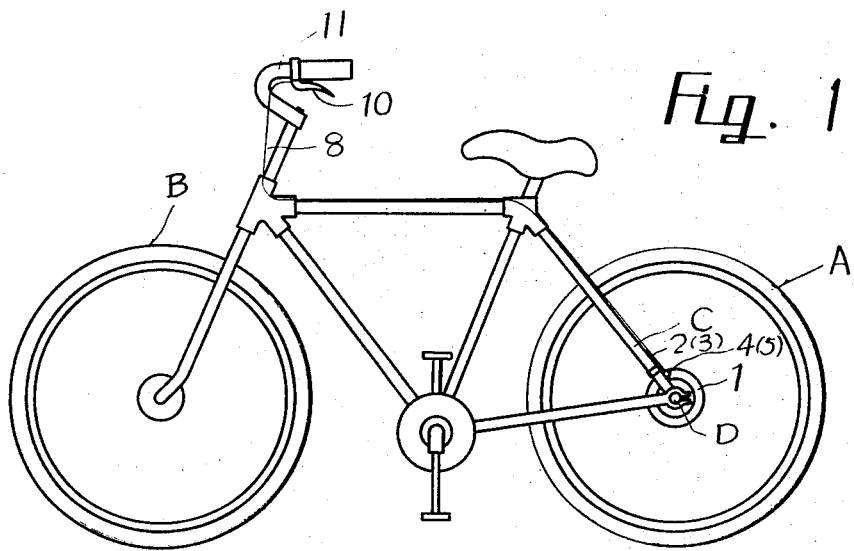

United States Patent
Kine

[15] 3,680,663
[45] Aug. 1, 1972

[54] DISK BRAKE FOR A BICYCLE

[72] Inventor: Masayoshi Kine, c/o Shimano Industrial Co. Ltd., No. 77, 3-cho, Oimatsu-cho, Sakai, Japan

[22] Filed: July 13, 1970

[21] Appl. No.: 54,363

[30] Foreign Application Priority Data

Dec. 23, 1969 Japan.....................44/122801

[52] U.S. Cl....................................188/24, 188/72.9
[51] Int. Cl. .............................................B62l 1/16
[58] Field of Search...........188/59, 24, 26, 72.6, 72.9

[56] References Cited

FOREIGN PATENTS OR APPLICATIONS

| | | |
|---|---|---|
| 541,983 | 10/1922 | France..............................188/24 |
| 872,326 | 2/1942 | France..............................188/24 |
| 875,535 | 6/1942 | France..............................188/24 |
| 898,290 | 7/1944 | France..............................188/24 |
| 903,429 | 1/1945 | France..............................188/24 |
| 50,593 | 3/1910 | Switzerland..................188/72.9 |

*Primary Examiner*—Duane A. Reger
*Attorney*—McGlew and Toren

[57] ABSTRACT

A brake disk rotatable in synchronism with a wheel and arranged adjacent a bicycle frame to which a pair of brake arms constituting a force doubling mechanism substantially operable by a single lever are mounted to be swung at both sides of said brake disk, said brake arms being provided in one end with a pair of brake shoes and in the other end with a link device constituting a force doubling mechanism substantially operable by a toggle joint, and said link device being operable by wire rope means in the manner of securing the most reliable and effective braking contact of said brake shoes upon the brake disk with light manipulation touch.

3 Claims, 9 Drawing Figures

PATENTED AUG 1 1972

3,680,663

SHEET 1 OF 5

INVENTOR
MASAYOSHI KINE

BY McGLEW & TOREN
ATT.

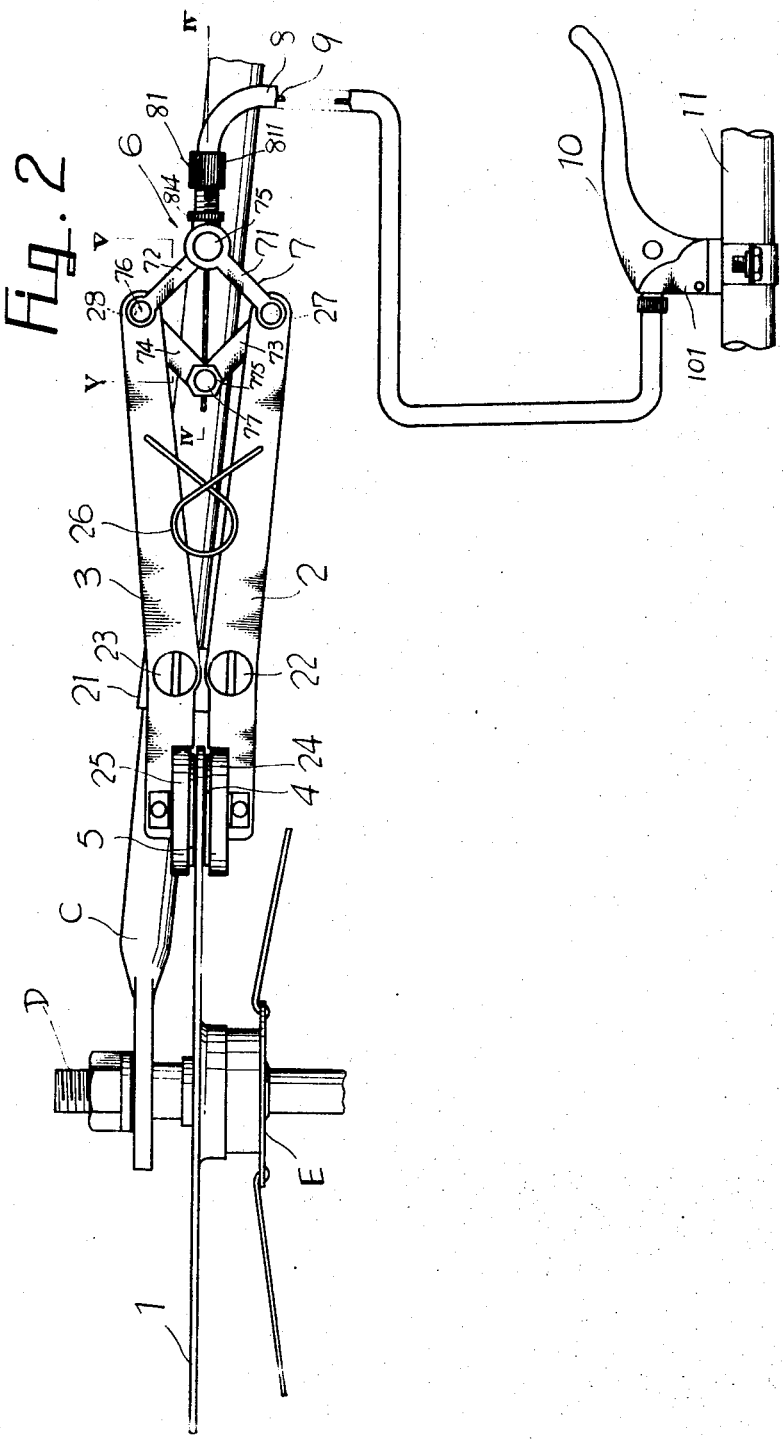

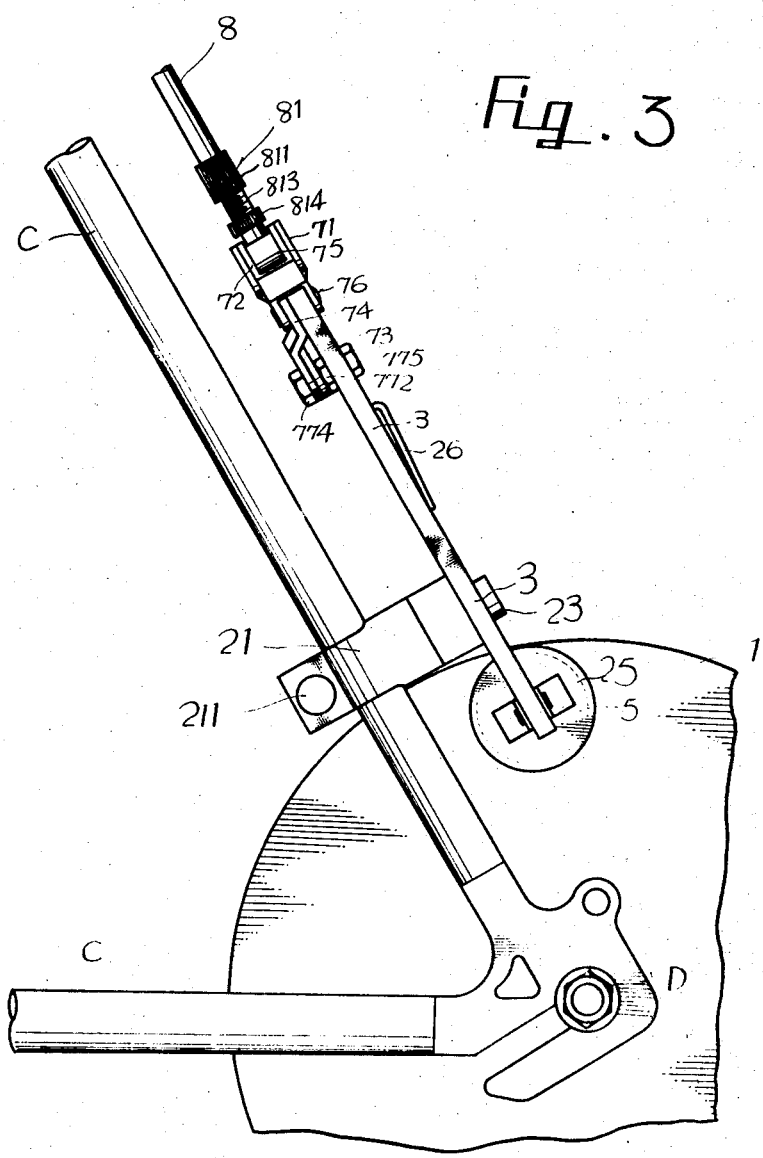

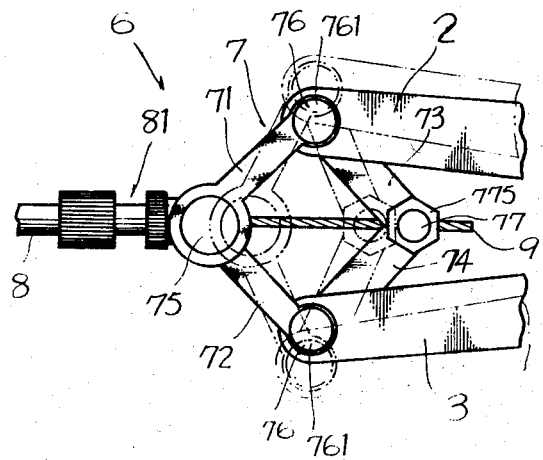
Fig. 6
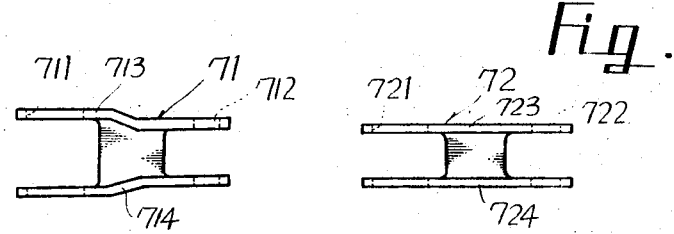
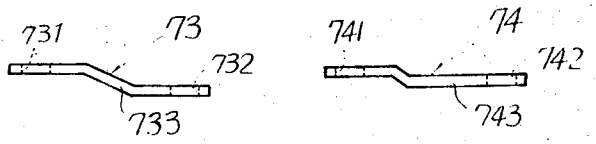
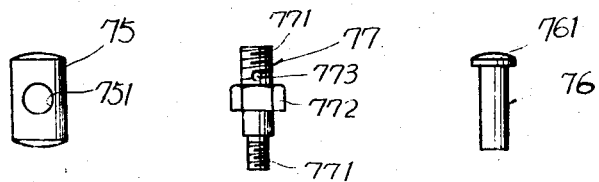
Fig. 7

DISK BRAKE FOR A BICYCLE

This invention relates to a disk brake mechanism to be used for a safety bicycle of the most common type. Conventionally speaking, a disk brake mechanism is widely in use especially for an automobile or any other similar vehicles, and its mechanical elements are composed of a brake disks which are rotatable with wheels and of brake shoes which are arranged in opposed relation with each of these disks in the manner that when the brake shoes are pressed against these disks, the rotation of the brake disks or the rotation of the wheels is forcibly brought to a halt. As a means for operating said brake shoes against the wheels of the automobile or the like is commonly applied a hydraulic brake shoe operating means. However, when this type of the means is applied, it is inevitably accompanied with a great disadvantages that the mechanical construction as a whole cannot but be excessively complicated.

Referring to a disk brake mechanism applicable to a bicycle, such a type has been well known that brake shoes are provided with brake arms, and the extremities of these brake arms are disposed in such a manner as to connect with a cam means so that when said cam means is moved, the brake arms are swung in one direction and the rotation of a wheel shaft is stopped by means of the brake shoes. However, said disk brake for a bicycle has disadvantages in that it is to be operated through means of the cam means, and gives a cycler a sense of very ponderous hand operation, as a consequence, often causing him to fail in accurately controlling the disk brake; on the top of that, said disk brake has an additional disadvantage in that it requires an excessively complicated structure for moving the cam means.

Thus the present invention aims at eliminating the above-mentioned defects and disadvantages of the conventionally well known disk and at the same time obtaining such a disk brake that is very simple in structure and controllable by easy manipulation. Accordingly, the main object of the invention is to provide a disk brake for a bicycle that can be controllably braked by a slight force alone in the exact and safe manner. Another object of the invention is to provide a disk brake for a bicycle that the operational mechanism thereof is much simplified and the brake lever of manipulating said disk brake can be mounted in any free portion of a bicycle frame member so as to enable a cycler to manipulate the brake with great ease and high safety. Further another object of the invention is to provide a disk brake for a bicycle that even though it has been abrassively worn away until at last to produce a change in its braking effect, it is yet at any time ready for adjustment suitable enough to give full play to its normal braking effect.

Further another object of the invention is to provide such a disk brake that can promptly act the excessively increased braking force upon the brake lever when it has just operated beyond its predetermined extent thereby making it always possible to secure the exact and quick braking effect.

Moreover another object of the invention is to provide such a disk brake that when it is in braking operation, the brake shoes are moved in parallel to the disk and synchronously brought into contact throughout their surface with the brake disk under equal pressure, thereby securing a good braking effect.

Accordingly, the present invention is characterized in that the brake shoes are integrally operable by combined use of a toggle joint type force doubling mechanism and a lever type force doubling mechanism.

While the novel constructions of the invention are as defined in what is claimed, the detailed description of the invention is as specified hereinafter.

Figure 4:
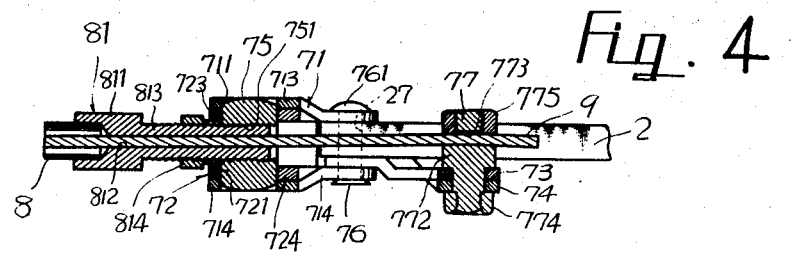
Figure 5:
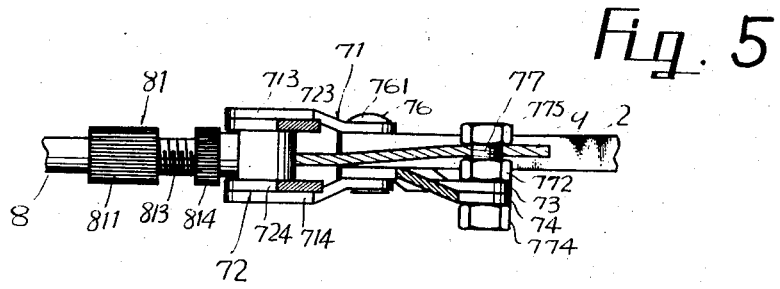
Figure 8:
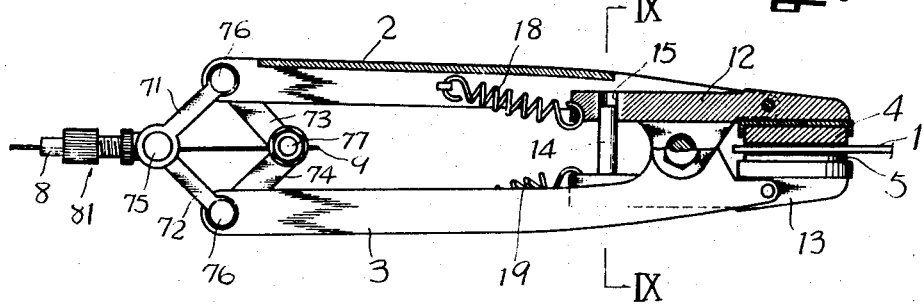
Figure 9:
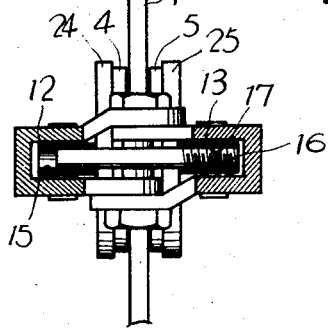

Firstly setting forth the accompanying drawings,

FIG. 1 is a side elevation view showing a main bicycle body to which the disk brake of the present invention is applied, FIG. 2 is a plan view in which the brake mechanism of the invention is shown in enlarged form and mounted on a bicycle frame member, FIG. 3 is a side elevation view of the same, FIG. 4 is a cross-sectional view taken on the line 4—4 of FIG. 2, FIG. 5 is a cross-sectional view taken on the line 5—5 of the same, FIG. 6 is a diagrammatic view illustrating the operational state of the brake embodied in accordance with the invention, FIG. 7 is an illustration of a link mechanism disassembled to individual components, FIGS. 8 and 9 are both illustrative of further modifications in disclosed embodiments, and in which especially FIG. 8 is a plan view partially showing one of the modified embodiments of the invention, and FIG. 9 is a cross-sectional view taken on the line 9—9 of the same.

Setting forth in detail in the second place the disk brake of the invention with reference to the accompanying drawings, said disk brake comprizes a brake disk 1 mounted on either a rear wheel A or a front wheel B in the manner of being rotatable therewith, a pair of brake arms 2, 3 swingingly mounted to a bicycle frame member C, a pair of brake shoes 4, 5 secured respectively to said brake arms 2, 3 in opposed relation with said brake disk 1, and a mechanism 6 for operating said brake arms 2, 3.

In the drawing is illustrated the construction that a brake is mounted on the rear wheel A of a bicycle as is best shown in FIG. 1. Said brake disk 1 is secured to a hub E rotatably mounted on a wheel shaft D fixed to said bicycle frame member C in the center of said rear wheel A in the manner that it can rotate together with the hub E. Said brake disk 1 is composed for instance of a metallic plate, hard vulcanized india rubber, vulcanized fiber or any other suitable material.

The brake arms 2, 3 are to be pivotally mounted in horizontal relation to one of the bicycle frame members C arranged adjacent said brake disk 1, and they are substantially pivoted by means of pivots 22, 23 on the top surface of a separable clip 21 encircling said bicycle frame member C and rigidly fixing the same as shown in FIGS. 2 and 3.

The pivoting point where these brake arms 2, 3 are pivoted is positioned closer toward the brake disk 1 from the center of their lengthwise direction. The deviation of this pivoting point of the brake arms 2, 3 from their center is freely selected up to a reasonable extent, and if the distance is made shorter between said pivoting point and the point where the brake arms 2, 3 act upon the brake disk 1, then these brake arms 2, 3 can of course be operated by a cycler with very light manipulation touch. However, in this case, the distance must be made as much longer within which the brake arms 2, 3 can operate. Thus the selection of said pivoting point is to be made in consideration of the range within which said operational mechanism 6 of the brake arms 2, 3 described hereinafter will operate. The distance from one end of each of the brake arms 2, 3 to the pivoting points 22, 23 is about twice as long as the distance from the other end of each of the brake arms 2, 3 to the pivoting points 22, 23 is. This positional relation of said brake arms 2, 3 is selectively changeable by moving aforesaid separable clip 21 along the bicycle frame member C.

The movement of the separable clip 21 is easily possible by adjusting a bolt 211 for constrictively fixing the same. A pair of the brake shoes 4, 5 immovably held by means of shoe holders 24, 25 respectively secured to one end of each of the brake arms 2, 3 are disposed symmetrically in opposed relation with each other in the manner of contacting with both faces of the brake disk 1 and giving the same a predetermined resisting power thereby to selectively stop the rotational movement of the brake disk 1.

For these brake shoes 4, 5, use is made of a proper material that can give them a predetermined resisting power, such for instance as hard vulcanized india rubber, hard vulcanized fiber or the like as has been mentioned above. Said shoe holders 24, 25 are arranged detachably so that whenever the brake shoes have been worn away they are easily replaceable with other usable substitutes.

Between the brake arms 2, 3 there is interposed a spring means 26 that normally presses the brake shoes 4, 5 in the direction where they can keep at a distance from the brake disk 1.

In the other end of each of the brake arms 2, 3 are perforated holes 27, 28 through which the brake arm operational mechanism 6 hereinafter described is to be mounted to the brake arms 2, 3. By operating said operating mechanism 6 the brake arms 2, 3 are swung with said pivoting points as their center so that the brake shoes 4, 5 are forcibly brought into strong contact with the brake disk 1 on the principles of the lever and fulcrum.

Said brake arm operational mechanism 6 is composed of a pantograph-type link or a parallelogrammic link device 7, the outer wire 8 having one end thereof connected to said device 7, and also of the inner wire operating handle lever 10 mounted to a handle rod 11. Said parallelogrammic link device 7 comprises four link elements to form a parallelogram, wherein, as is clearly shown in FIG. 7, the first link element 71 is composed of a pair of sheet plates 713 and 714 disposed in opposite relation with each other and provided respectively with holes 711 and 712 perforated in proximity of both ends of said first link element 71; the second link element 72 is composed of a pair of paralleled sheet plates 723 and 724 disposed in opposite relation with each other and provided with holes 721 and 722 perforated in proximity of said second link element 72, the third link element 73 and the fourth link element 74 are likewise respectively composed of a single sheet plate 733, 744 provided with holes 731 and 732 perforated in proximity of both ends of each of the third link element 73 and the fourth link element 74.

A pin 75 for connecting one end of each of the first link element 71 to the second link element 72 has a lateral hole 751 formed therein with a screw wire 8. Said pin 75 is inserted into the overlapped holes 711 and 721 of both the first link element 71 and the second link element 72, and held in said lateral holes 751 by screwing said one end of the holder 81 in said lateral hole 751 so that the first link element 71 and the second link element 72 can be pivotally linked.

A pair of pins 76, 76 for pivotally linking one end of the brake arm 2 to each end of the first link element 71 and the third link element 73, and likewise for pivotally linking one end of the brake arm 3 to each end of the second link element 72 and the fourth link element 74 are provided respectively with a head 761 having a substantially larger diameter than that of said holes 722 and 742 through which these four link elements are linked.

The hole 27 of said brake arm 2 is overlapped with 712, 732 of the link elements 71, 73, and likewise the hole 28 of said brake arm 3 is overlapped with the holes 722, 742 of the link elements 72, 74 whereby said pins 76, 76 are respectively inserted into each of the holes 27, 28. After that, said pins 76, 76 are suspended stationary by said head 76 thereof while the opposed end of said head 761 is caulked so as to mount said pins 76, 76 within said holes 27, 28 thereby making it possible to mount said parallelogrammic link device 7 to the brake arms 2, 3 and pivotally linking one end of the first link element 71 to one end of the third link element 73, and one end of the second link element 72 to one end of the fourth link element 74 respectively.

A pin 77 for linking one end of the third link element 73 to one end of the fourth link element 74 is provided at its upper and lower sides with screw grooves 771, 771 formed in its outer periphery and also provided in its intermediate portion with a flange portion 772 of a substantially larger diameter than that of the holes 731, 741 through which the link elements 73, 74 are pivotally mounted.

At the upper side of said flange portion 772 is perforated a hole 773 for inserting the inner wire 9 therein. Said screw grooves 771, 771 are so formed as to be screwable to nuts 774, 775. The third link element 73 and the fourth link element 74 are overlapped one another in the manner that the holes 731 and 741 are made into a single hole, into which then, said nut 774 is inserted thereby to pivotally connect the third link element 73 to the fourth link element 74. After that, the inner wire 9 is inserted into the hole 773 and the nut 775 is constrictively tightened thereby to secure one end of said inner wire 9.

One end of the outer wire 8 is held by means of the holder 81 screwed to the lateral hole 751 of the pin 75 as is shown in FIG. 5. Said holder 81 comprises a holding element 811 and a screw portion 813 the outer periphery of which is provided with a screw groove and in the inside of which is provided a hole 812 for inserting the inner wire 9.

As has been mentioned above, said screw portion 813 has a lock nut 814 which secures the former to the lateral hole 751 of the pin 75 in screwed relation therewith. The other end of the outer wire 8 is held by means of a wire holder 101 of the handle lever 10 pivotally mounted to the bicycle handle rod 11. One end of the inner wire 9 is secured to the pin 77 while the other end of the same is, passing through the hole 812 of the holder 81 into the inside of the outer wire 8, held by means of aforesaid handle lever 10. Therefore, when this handle lever 10 is operated by hand, the inner wire 9 is moved in correlation with the outer wire 8, consequently operating the parallelogrammic link device 7.

Thus the brake shoes 4, 5 are operated through means of the brake arms 2, 3 swung about the pivoting point deviated from their center and also through means of the parallelogrammic link device 7 composed of a toggle joint type force doubling mechanism applied to these brake arms 2, 3.

Accordingly, when the inner wire 9 is drawn by operating the handle lever 10, force is brought to the pivoting point of the link elements 71, 72 and the pivoting point of the link elements 73, 74 respectively, with the result that said two pivoting points are swung in the direction where they are drawn closer whereby the ends of these link elements pivoted on the pins 76, 76 are moved outwardly.

As have been mentioned above, the brake arms 2, 3 connected to each end of these link elements are swung about the pivoting points deviated from their center and consequently one-sided ends of these brake arms 2, 3 are forcibly moved outwardly whereas the other sided ends of the same are moved inwardly to come closer as is best shown in FIG. 6 so that the brake shoes 4, 5 secured to said other sided ends are forcibly brought into contact with the brake disk 1.

According to the present invention, therefore, the swinging movement of the brake shoes 4, 5 toward the brake disk 1 to come into contact therewith is made possible by providing in combination a parallelogrammic link device constituting a toggle joint type force doubling mechanism and the brake arms 2, 3 constituting a single lever. Thus even if the force of pulling the inner wire 9 is substantially small, it brings a very strong force to each end of the link elements connected to the brake arms 2, 3 since, in case the pivoting points of the link elements are applied force, a pair of virtual triangles supposed with said pivoting points as their vertexes are forcibly pressed from the direction of said vertexes and crushed to change their shapes. Consequently the brake arms 2, 3 are violently swung to produce by far greater force due to the deviation of each pivoting point where they are swung, thereby reliably operating the brake shoes 4, 5.

Accordingly, it is understood that merely by applying small force, the disk brake of the present invention displays a very great braking effect and operates its braking contact in the most reliable manner.

In addition, the more the above-mentioned crush by pressure advances, the more quickly and more greatly the force given to each end of the link elements connected to the brake arms will grow in conformity with the accepted principles of a toggle joint type force doubling mechanism for which a parallelogrammic link device is definitely employed in the present invention. In other words, the force to stretch out the brake arms is to excessively increase according as the pivoting points to be drawn closer to each other when drawn by the inner wire will come close to the line along which there are connected the opposed ends of the link elements connected to the brake arms. Thus at the final stage of braking operation, or at need of emergent braking operation, an extremely good and reliable braking effect can be secured.

Incidentally, due to the construction that the holder 81 of the outer wire 8 is screwed into the pin 75 inset in one of the pivoting points of the parallelogrammic link device 7, and that the nut 775 for fixing the inner wire 9 is mounted on the pin 77 inset in the other pivoting point of said device 7, it is quite feasible to selectively adjust the position where the inner wire 9 is to be fixed by means of said nut 775, so that the configuration of said parallelogrammic link device 7 can be as freely as is preferred.

Thus even if the brake shoes 4, 5 have been worn away and deprived of their practically reliable braking effect, they can recover the braking effect as reliable as before merely by selectively adjusting the position of said pivoting points. Besides the embodiments referred to in the foregoing explanation, the disk brake for a bicycle of the present invention is practically modifiable as is shown in FIGS. 8 and 9. Namely, what are shown in FIGS. 8 and 8 are the modified embodiments in which the brake shoes 4, 5 are not immediately mounted to the brake arms 2, 3 but mounted to operating elements 12, 13 pivoted on said brake arms 2, 3 so that the brake shoes 4, 5 can move in parallel relation with the brake disk 1.

The means for moving said brake shoes 4, 5 in parallel to the brake disk 1 is composed of a pin 14 extruded from said one operating element 13, and a guide hole 15 perforated in the other operating element 12, as well as said operating elements 12, 13 themselves.

One end of said pin 14 has a screw 16 and is constrictively screwed to a screw hole 17 of the operating element 12 whereas the other end of said pin 14 is inserted in the guide hole 15 in the manner that it can move in the inside of this guide hole 15 along with swinging movements of the brake arms 2, 3 thereby preventing the operating elements 12, 13 from swingingly moving and permitting the same to move in parallel. Designated at 18 is a spring means mounted between the brake arm 2 and the operating element 12. Likewise designated at 19 is another spring means mounted between the brake arm 3 and the operating element 13. These two spring means 18 and 19 are there to restore the operating elements 12 and 13 to their respective original position after the brake has been applied.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

Having thus described our invention, what is claimed is:

1. A disk brake for a bicycle comprising a brake disk fixedly mounted to a wheel of said bicycle and rotated therewith, said disk comprising a pair of opposed, parallel frictional engagement surfaces, a pair of brake arms pivotally mounted to a frame of said bicycle, actuating means engaging each of said brake arms at one end thereof to simultaneously rotate said arms in an opposed manner about their respective pivotal mountings, a pair of brake shoe elements including brake shoe surfaces for frictionally engaging said brake disk surfaces, each of said brake shoe elements being pivotally mounted upon one of said brake arms at an end thereof opposite said actuating means, and guide means engaging each of said brake shoe elements and extending directly therebetween for insuring that said brake shoe elements move with said brake shoe surfaces maintained parallel to said brake disk frictional engagement surfaces when said brake arms are actuated to engage said disk brake.

2. A disk brake according to claim 1, wherein said guide means comprise a pin mounted to extend between said brake shoe elements, with at least one of said brake shoe elements being movable relative to said pin.

3. A disk brake according to claim 2, wherein said pin is fixed to one of said brake shoe elements and movably mounted relative to the other.

* * * * *